ERROR DETECTION CIRCUIT

Filed June 29, 1959 2 Sheets-Sheet 1

⊞ = OR GATE

[&] = AND GATE

INVENTORS
R. W. BRATSCHI
C. W. FRITZE
V. E. HERZFELD
P. H. SMITH
BY Cushman, Darby & Cushman
ATTORNEYS

ERROR DETECTION CIRCUIT

Filed June 29, 1959 2 Sheets-Sheet 2

INVENTORS
R. W. BRATSCHI
C. W. FRITZE
V. E. HERZFELD
P. H. SMITH
BY Cushman, Darby & Cushman
ATTORNEYS

United States Patent Office 3,191,153

Patented June 22, 1965

3,191,153

ERROR DETECTION CIRCUIT

Raymond W. Bratschi, Curtis W. Fritze, Valerius E. Herzfeld, and Paul H. Smith, all of St. Paul, Minn., assignors to Sperry Rand Corporation, New York, N.Y., a corporation of Delaware Filed June 29, 1959, Ser. No. 823,599

20 Claims. (Cl. 340—172.5)

This invention provides a means by which an electronic computer is able to perform a self-analysis of an error.

In most computer applications, when an error occurs in computer operation the machine is forced into a "stop" state which requires manual intervention to allow the reinitiation of an operation. When a computer is being used on-line as in a digital data system, such as an Air-Lines Reservation System, where a multiplicity of remote stations are constantly sending queries to and expecting answers from the computer, the down time resulting from this manual intervention creates quite a burden. This is especially true if the errors are non-repetitive, such as those caused by momentary transients. In addition, even in the case of repetitive errors, time is consumed in determining whether the error was generated in the computer or in peripheral equipment. This invention provides a means of detecting an error, analyzing it, and allowing the computer to continue operation if the analysis determines that continuation is possible.

A timer is preset to run for a length of time slightly in excess of the time required for a computer to correctly perform an electronic operation. If the time runs out before completion of the operation, an error signal is generated. This error signal is propagated through a checking circuit consisting of a multiplicity of standard type flip-flops, such as an Eccles-Jordan type. The signal probes the flip-flops via standard type "and" gates, to determine their state. Depending on the results of the probing action, one of four possible output signals is generated. Each of the signals is indicative of a different type of error and so each can be utilized to perform various functions as hereinafter described.

Therefore it is an object of this invention to determine the cause of an error in a digital data system.

It is another object of this invention to provide an electrical signal if the digital data system error is non-repetitive.

Still another object is to provide another electrical signal if the error is repetitive.

Another object is to provide still another electrical signal if the computer memory has been affected.

Another object is to provide still another electrical signal if the error was due to a computer malfunction.

A further object of this invention is to provide a circuit which discriminates between electronic operations of excessive and proper duration.

Another object of this invention is to provide a circuit which produces an electrical signal when an electronic operation is of excessive duration.

Another object is to provide a circuit which produces another electrical signal when the electronic operation is repeated and is again of excessive duration.

Another object is to provide an improved timing circuit.

A further object is to provide a circuit that will produce an electrical output signal at the end of a timed duration and which is capable of being returned to its quiescent state of operation at any time after the quiescent operation state has been changed.

A still further object is to provide a circuit which includes the charging of a capacitor as a timing means and where the capacitor charging rate is very slow in comparison to the capacitor discharging rate.

Other objects and advantages of this invention will become obvious to those having ordinary skill in the art by reference to the following detailed description of exemplary embodiments of the apparatus and the appended claims. The various features of the exemplary embodiments may best be understood with reference to the following drawings, wherein:

Figures 1, 2:
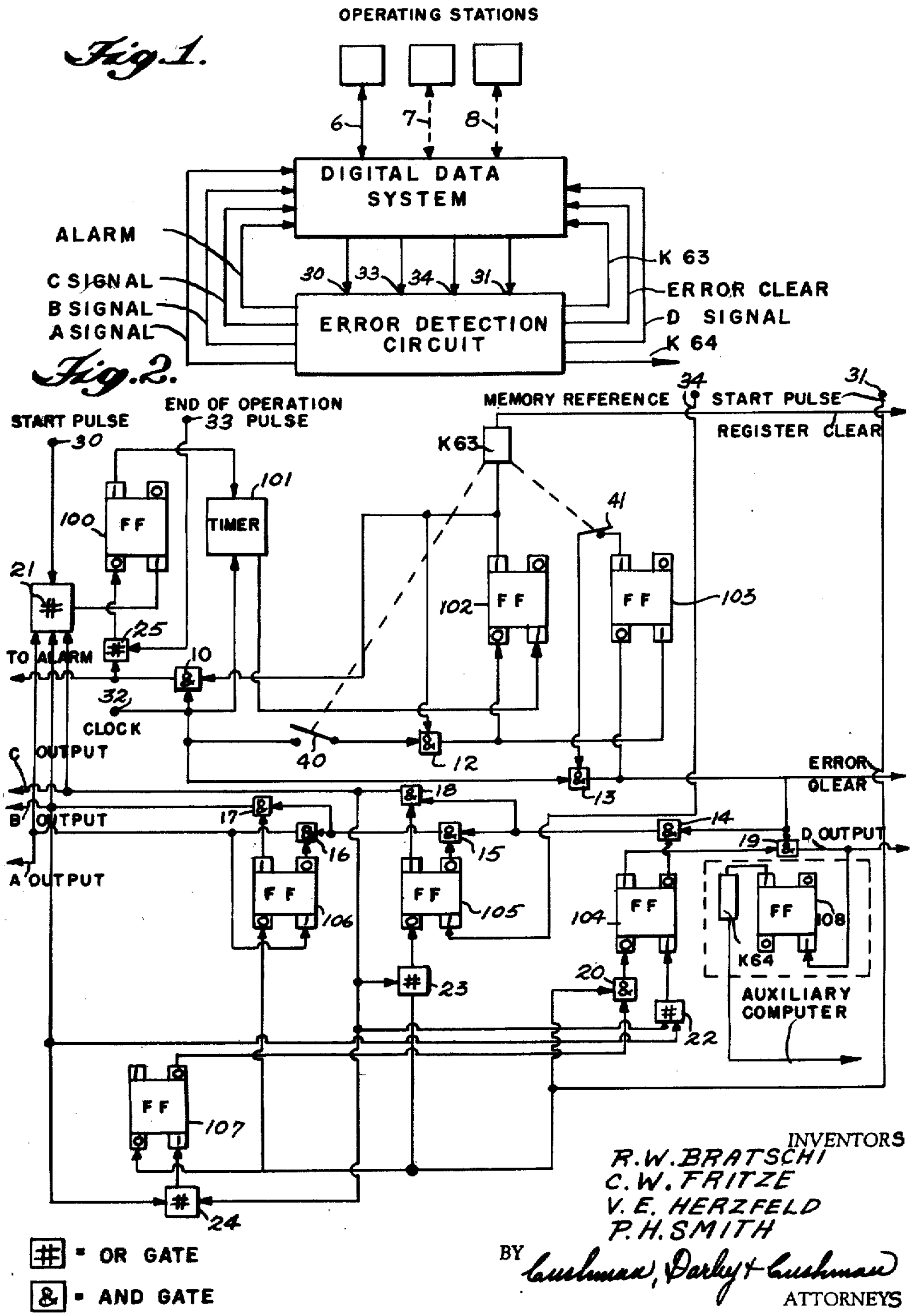
FIGURE 1 is a block diagram of the Error Detection Circuit as used in a Digital Data System.
FIGURE 2 is a block diagram of the Error Detection Circuit.

FIGURE 1 shows a block diagram of the Error Detection Circuit as used in a digital data system. Requests from various operating stations entering the system are represented by lines 6, 7, and 8. Answers returned to the operating stations are represented by the same lines. When a request enters into the system, along line 6, for example, a start pulse is sent to the Error Detection Circuit at input 30. This pulse starts an operation which times the duration of the system operation in response to the request from line 6. If the system operation is correct, it will end during the time necessary to perform the longest correct system operation, and an end of operation pulse will be sent to the Error Detection Circuit at input 33. This will stop the timing operation and reset the timer. If no end of operation signal is received by the Error Detection Circuit during the time necessary to perform the longest correct system operation, an error has occurred in the system and assuming the system operation has not referenced the computer memory, the timing operation will cause an A output signal to appear from the Error Detection Circuit. This A signal will be returned to the system to cause the same operation to be repeated. A signal simultaneous with the A signal will at the same time reinitiate the timing operation. If a second error occurs, the timing operation will cause a B output signal to appear from the Error Detection Circuit. A B output signal is indicative that these errors were not due to transient voltages. The B output signal is returned to the system initiating a previously stored "re-enter" answer to be sent back along line 6 to the inquiring operating station. The answer will be timed by the Error Detection Circuit, and if it is longer than the longest correct operation duration, a D output signal will result. If the answer program is performed correctly, the answer requests a new query. The system operation in response to this new query initiates another timing operation. If the new system operation is erroneous, the corresponding timing operation causes the D output signal to appear from the Error Detection System.

If the digital data system operation in response to the original request from line 6 has referenced the computer memory, a signal will be sent to the Error Detection Circuit at input 34. In this case, if the timing operation detects an error, a C output signal will result. The C output signal will be returned to the system initiating a previously stored program to send back to the inquiring station an "error" answer. The answering program is timed, and if an error is detected, the D output signal will appear from the Error Detection Circuit. If the answering program is performed correctly, the system is ready for a new query. If the new query results in an erroneous digital data system operation, the D output signal will appear from the Error Detection Circuit. The D output signal is indicative of a computer error and as such will be utilized to stop the computer operation. It may also be utilized to switch operation to a new computer.

Proceeding to examine the Error Detection Circuit in detail, reference is made to FIGURE 2 wherein is shown a block diagram of the circuit. All flip-flops are of any standard type well known in the art and have two inputs and two outputs. A signal into the "1" input causes the flip-flop to switch to the "1" state if it had previously been in the "0" state. A signal to the "0" input causes the flip-flop to switch to the "0" state if it had previously been in the "1" state. When the flip-flop is in the "1" state, a signal will be present at the "1" output and no signal at the "0" output. When the flip-flop is in the "0" state, the reverse is true.

The blocks containing "&" symbol are standard "and" gates, which means that there must be a signal on all the input lines to said blocks before an output signal will be present. Those blocks containing a "#" symbol are "or" gates wherein if any of the inputs have a signal, an output signal will result.

In addition, all flip-flop inputs contain a delay circuit therein so that there is a delay between the time of a signal input and a corresponding output signal.

Assume all flip-flops are initially in the "0" state. This can be provided by a manual input (not shown) to the "0" input of all the flip-flops.

When a query is received from an agent's set, the computer starts its programmed electronic operation to answer the query. At the same time, a start pulse is sent to "or" gate 21 from input terminal 30 to set the flip-flop 100 to the "1" state. (The start pulse also appears at terminal 31, but since that terminal is connected to the "0" inputs of four of the flip-flops and those flip-flops are already in the "0" state, this start pulse has no effect.) The "1" output of the flip-flop 100 starts the timer 101. The timer 101 is pre-adjusted to run a length of time slightly greater than the time necessary for the longest computer electronic operation. If the computer operation is completed before the timer runs out, an end of operation signal is sent to the flip-flop 100 via terminal 33 and "or" 25 setting it back to the "0" state to be ready for another start pulse. If the time runs out before the operation is completed, it indicates that an error occurred in the operation and a signal appears on the output of the timer going to the "1" input of the flip-flop 102 setting it to a "1." The signal on the timer output is generated internally in the timer by using the clock input on terminal 32 to probe the timer. The clock is a fixed frequency square wave signal, typically of a frequency of 200 c.p.s. After the timer runs out, thereby detecting an error, the presence of a clock pulse will cause the signal to appear on the output of the timer.

Figures 3, 4:
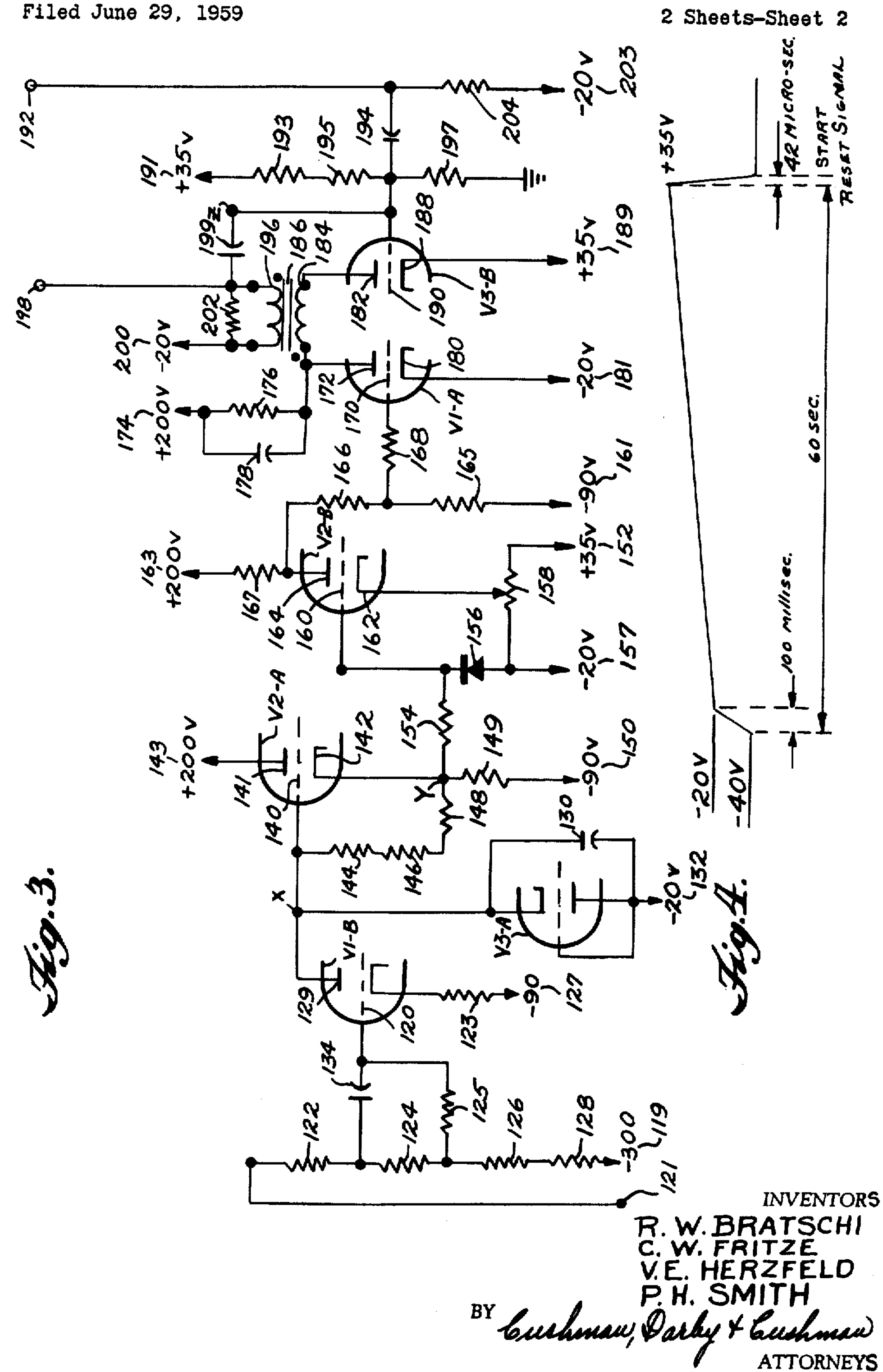
FIGURE 3 is a schematic diagram of the improved timer circuit.
FIGURE 4 is a voltage versus time plot of the timing means employed in the timer circuit.

A circuit which has been developed for use in the Error Detection Circuit as the timer 101 is shown in detail in FIGURE 3. Although this timing circuit finds use in the Error Detection Circuit it is understood that there are many other uses to which it may be put. Basically, the timing circuit serves to delay the enabling of an electronic gate for a pre-determined time interval subsequent to an initiate signal. Further, if the initiating signal is removed prior to the lapse of the predetermined time interval the electronic gate will not be enabled. A periodic pulse signal is applied to the electronic gate from another input so that any time the gate is enabled, the periodic pulse signal will result in an output signal. By replacing the initiate signal with a reset signal, the timing circuit is quickly placed in condition to again reform the above mentioned delay subsequent to another initiate signal.

Continuing to refer to FIGURE 3, in the quiescent state of operation of this circuit, a reset signal is applied to the grid 120 of triode V1–B through an input 121, a voltage divider comprising a D.C. voltage source 119 of approximately −300 volts and resistors 122, 124, 126, and 128, and resistor 125. This reset signal causes tube V1–B to conduct heavily. One end of capacitor 130 is connected to the plate 129 of tube V1–B at junction X. The cathode of triode V1–B is connected through resistor 123 to a D.C. voltage source 127 of approximately −90 volts. The other end of capacitor 130 is connected to a voltage source 132 of approximately −20 volts. Connected across the capacitor 130 is a tube V3–A. With tube V1–B conducting heavily, junction X is at a potential of about −40 volts. Therefore the side of capacitor 130 connected to junction X is at a potential of approximately −40 volts while the other side is at approximately −20 volts. Receipt of an initiate signal in the form of a negative voltage on input 121 causes tube V1–B to cut-off. Capacitor 134 which is connected between grid 120 and resistor 122 aids in transmitting the negative going leading edge of the initiate signal to grid 120, thereby cutting the tube off sharply. When tube V1–B cuts off, the capacitor 130 discharges quickly through tube V3–A. The potential at junction X quickly rises to approximately −20 volts. Junction X is also connected to grid 140 of tube V2–A which is connected as a cathode follower. The plate 141 receives its D.C. bias from voltage source 143 of approximately 200 volts. The rise in voltage at junction X causes grid 140 to rise in potential increasing the cathode to plate current in tube V2–A. Junction X is also connected to the cathode 142 of tube V2–A at junction Y through resistors 144, 146, and 148. Junction Y is connected to a D.C. voltage source 150 of approximately −90 volts through resistor 149 and to another D.C. voltage source 152 through resistor 154, diode 156, and potentiometer resistor 158. Diode 156 is also connected to a D.C. voltage supply 157, thereby clamping the lowest value of junction Y, neglecting the voltage drop across resistor 154, to approximately −20 volts. The cathode follower action of tube V2–A causes the voltage at junction Y to be slightly less negative than the voltage at grid 140. With tube V1–B cut off capacitor 130 begins to charge toward the voltage at Y through resistors 144, 146, and 148. The resistors are of a high impedance, e.g., 4.7 megohm each in a typical case. This high impedance and the effect of tube V2–A maintains a low magnitude essentially constant charging current through said resistors thereby establishing a slow, substantially linear charging rate of capacitor 130. The rising voltage on capacitor 130 causes the voltage on grid 140 to rise which in turn causes the voltage at junction Y to increase through increased tube current. This boot strap operation would continue until the tube reached plate current saturation.

Junction Y is also connected to grid 160 of triode V2–B through resistor 154. Triode V2–B is an amplifier normally biased beyond cut-off by placing cathode 162 at a positive potential with respect to grid 160. This is accomplished by connecting cathode 162 to potentiometer 158. The plate 164 receives its D.C. bias from a D.C. voltage source 165 of approximately 200 volts through resistor 167. When the voltage at junction Y increases to a level slightly above the cut-off bias, tube V2–B starts to conduct causing the voltage on plate 164 to drop. Plate 164 is directly coupled to the grid 170 of tube V1–A through resistors 166 and 168. Tube V1–A serves the purpose of enabling and disabling the electronic gate, triode V3–B. The plate 172 of tube V1–A is connected to a D.C. voltage source 174 of approximately 200 volts through parallel circuit of resistor 176 and bypass capacitor 178. The cathode 180 of tube V1–A is directly connected to D.C. voltage source 181 of approximately −20 volts. Grid 190 is maintained at a positive bias due to a voltage divider comprising a D.C. voltage source 191 of approximately 35 volts and resistors 193, 195 and 197. Plate 172 is also connected to plate 182 of gate V3–B through the primary 184 of transformer 186. The cathode 188 of gate V3–B is connected to a D.C. voltage source 189 of approximately 35 volts. V1–A is normally conducting heavily due to the grid 170 bias established by a voltage divider made up of D.C. voltage sources 161 and 163, and resistors 165, 166 and 167. Since V1–A and V3–B have a common resistor 176 in the D.C. path, the voltage at plate 182 relative to the voltage at cathode 188 is too low to allow plate current to flow through the primary 184 of transformer 186 even though a positive going signal is applied to the grid 190 through input 192 and A.C. coupling capacitor 194. Input 192 is also connected to a D.C. voltage source 203 of approximately −20 volts through resistor 204. When the dropping plate voltage of V2–B is led to the grid of V1–A, the plate current of tube V1–A decreases, its plate voltage increases to a voltage where gate V3–B will be enabled so that a positive going pulse to the grid of V3–B will result in a pulse of current through the primary 184 of transformer 186. The circuit may be entered to test the grid 190 voltage at point Z which is shown connected to secondary winding 196 through a high impedance capacitor 199. The secondary winding 196 is connected as one end to D.C. voltage source 200. Resistor 202 is further connected across the secondary winding. The current pulse in the primary will produce a pulse in the secondary 196 and on the output 198 connected thereto.

If at any time prior to the enabling of the gate V3–B, the negative initiate voltage is replaced with a positive reset voltage on the input 121, tube V1–B will start to conduct heavily. This will terminate the positive charging of capacitor 130 and cause it to discharge very quickly to approximately −40 volts through the low impedance path of tube V1–B and resistor 123 placing the circuit back in its quiescent state. Resistor 123 in a typical case is of approximately 100 ohms. As previously described this puts junction X at approximately −40 volts thereby returning all the tube circuits to their normal operating conditions so that gate V3–B is not enabled. The circuit is then in its quiescent state of operation and ready to respond to another initiate signal.

In a typical case, potentiometer 158 is adjusted so that gate V3–B will not be enabled until one minute after the start of the initiate signal. If a reset signal appears before the minute is up, the circuit will return to the starting condition, ready for another initiate signal, in approximately 42 microseconds. This gives a very high delay-time to reset-time ratio of 1.4 million to 1.

FIGURE 4 shows the voltage variation at X under the typical case described above. The diagram is not drawn to scale. Junction X is at approximately −40 volts when the initiate signal is received. It rises to −20 volts in about 100 milliseconds and then starts rising slowly toward 35 volts which is the voltage to which junction Y is increasing. When having reached 35 volts, a reset pulse is received and junction X returns to approximately −40 volts in about 42 microseconds.

The values used in the preceding description and as shown in FIGURES 3 and 4 are typical ones. Good circuit design techniques will alter these values depending on the circuit components used. It is therefore understood that this invention is not limited to these values.

When the circuit of FIGURE 3 is used in the Error Detection Circuit, input 121 corresponds to the input from flip-flop 100 to timer 101. Input 192 corresponds to clock input 32, and output 198 corresponds to the output from timer 101.

Continuing with the description of FIGURE 2, the "1" output of the flip-flop 102 energizes relay K-63 and enables "and" gates 10 and 12. Because of the built in delay in the flip-flop input, as previously mentioned, a clock pulse subsequent to that which caused flip-flop 102 to switch to a "1" state, will cause a signal out of "and" gate 10 to be fed back to flip-flop 100 via "or" gate 25 setting it back to the "0" state. This signal is also fed into an alarm which may be located at any convenient place in the system. Simultaneously the energization of relay K63 causes its normally open contact 40 to close while opening normally closed contact 41, allowing the clock signal into "and" gate 12. Since "and" gate 12 is enabled by the "1" output of flip-flop 102 a signal will appear at the "0" input of flip-flop 102 resetting it to the "0" state, and also at the "1" input to the flip-flop 103 setting it to the "1" state. Relay K63 principally performs the function of clearing out specific registers in the computer via relay contacts not shown. It is important that the signal shall not be allowed to propagate through the rest of the Error Detection Circuit until after said clearing step has been performed. This is accomplished through the use of contacts 40 and 41. Again, because of the built in delays, there will be a time delay before flip-flop 102 will allow K63 to deenergize to cause contact 41 to return to its normally closed position. When contact 41 does close, the "1" output from flip-flop 103 enables "and" gate 13 to allow an output when the next subsequent clock pulse occurs. The output from "and" gate 13 sets flip-flop 103 back to the "0" state, appears as an Error Clear signal which is returned to the digital data system, and probes "and" gates 14 and 19.

As flip-flop 104 is in the "0" state, "and" gate 19 is not enabled whereas "and" gate 14 is. The pulse signal, therefore, propagates down the line to "and" gates 15 and 18. With flip-flop 105 in the "0" state, only "and" gate 15 is enabled so that the pulse continues to "and" gates 16 and 17. Since flip-flop 106 is in the "0" state, "and" gate 16 is enabled whereas "and" gate 17 is not. The output of "and" gate 16 appears as the A output pulse signal while at the same time it sets flip-flop 106 to the "1" state. In addition, the output of "and" gate 16 puts a "1" input to flip-flop 100 through "or" gate 21, thereby reinitiating the cycle of operation.

If the original query, during which the error was detected, is still on the line (which is normal practice), the A pulse signal is utilized to allow the computer to perform its operation again, but without generating a start pulse. Again, the operation is timed and if no error is detected via the timer 101, the operation is completed and the computer is ready to receive a fresh query. A new query will generate a start pulse which will appear on inputs 30 and 31 thereby resetting flip-flop 106 back to the "0" state, and the entire previously described operation will be repeated.

If during the second attempt at the original query an error is detected by the timer, a signal will be propagated through the circuit of FIGURE 1 in the same manner as previously described except that since flip-flop 106 is in the "1" state, "and" gate 17 is enabled whereas "and" gate 16 is not. The output of "and" gate 17 performs the following multiple functions; (a) reinitiates the timer through "or" gate 21 and flip-flop 100, (b) puts a signal on the B output, (c) set flip-flop 104 to the "1" state via "or" gate 22, (d) sets flip-flop 107 to the "1" state via "or" gate 24. Thus flip-flop 106 and "and" gates 16 and 17 combine to perform a switching operation, i.e. the signal being propagated through the circuit is switched to appear on the B output.

It appears proper at this point to describe how a C output pulse signal is developed. Whenever the computer makes a reference to its memory section during an operation, a signal appears at terminal 34 setting flip-flop 105 to the "1" state. If the timer 101 detects an error during the same operation but subsequent to a memory reference, the output of "and" gate 14 (assuming for the present that flip-flop 104 is in the "0" state) will find "and" gate 15 disabled and "and" gate 18 enabled. The output of "and" gate 18 will appear as an output signal. Thus flip-flop 105 and "and" gates 15 and 18 combine to perform a switching operation, i.e. the signal being propogated through the circuit is switched to appear on the C output. In addition it will reinitiate the timer through "or" gate 21, reset flip-flop 105 to the "0" state via "or" gate 23, set flip-flop 104 to the "1" state via "or" gate 22, and set flip-flop 107 to the "1" state via "or" gate 24.

To recapitulate, an A output pulse signal appears when the first error occurs during a computer operation in response to a query, providing no memory reference has taken place during the operation. A B output pulse signal occurs when two errors are detected during the computer operation in response to one query, providing no memory reference has taken place during the operation. A C output pulse signal occurs if an error is detected and a memory reference has occurred during the operation. It should be noted that all three signals reinitiate the timer operation.

To continue the description of the operation, the occurrence of a B output signal or C output signal sets flip-flop 104 to the "1" state. This enables "and" gate 19 while disabling "and" gate 14 so that a subsequent signal indicative of an error will appear as a D output pulse signal. Once flip-flop 104 is set to the "1" state by a B output signal or a C output signal, the only way it can be reset to the "0" state (other than via a manual input not shown) is the coincidence at "and" gate 20 of a Start Pulse and flip-flop 107 in the "0" state. Since flip-flop 107 is set to a "1" state by a B output signal or a C output signal, a start signal pulse at 31 resulting from the initiation of a new query will not switch flip-flop 104 to the "0" state because of the lack of required coincidence of signals at "and" gate 20. Therefore, if an error is detected in the next subsequent digital data system operation on a new query after a B or C output signal has been generated, a D output signal will appear at the output of "and" gate 19. Thus flip-flop 108 and "and" gates 14 and 19 combine to perform a switching operation i.e. the signal being propagated through the circuit is switched to appear on the D output.

Although the aforementioned start signal at 31 will not switch the flip-flop 104 to the "0" state, it will so affect flip-flop 107. The internal delay in the flip-flop will prevent the "0" output of flip-flop 107 from fulfilling the coincidence requirement at "and" gate 20 at that time. However, the next subsequent start pulse at 31 will find gate 20 enabled thereby resetting flip-flop 104 to the "0" state. Therefore, a D output signal will occur if an error is detected following a B or C output signal, even if the error occurs during digital data system electronic operation on a new query. The system must be initiated by two new queries, with corresponding start signals, before the D output signal "and" gate 19 is disabled.

In summation, an A output pulse signal is generated when the first error is detected in a digital data system electronic operation and a B output pulse signal occurs when two errors occur during a single operation, providing that in both cases a memory reference has not occurred. A C output pulse signal occurs when an error has been detected in a computer operation, if a memory reference has taken place in said operaton. A D output pulse signal occurs when an error is detected following a B or C output signal if the error occurs prior to the second start signal following the B or C output signal. The four derived signals can be utilized for a variety of purposes. A typical utilization is described in the following paragraphs.

Each signal sets an indicator lamp in addition to initiating a previously stored internal program to cause a typewriter or paper tape unit to generate a permanent record of error.

The B signal initiates a program which had been previously stored in the computer to send back to the inquiring station a "re-enter" answer. This releases the computer so as to make it available for a new query.

The C output signal initiates a previously stored program to send back to the inquiring station an "error" answer. This releases the computer so as to make it available for a new query. It should be noted that since the B and C output signals reinitiate the timer, as described hereinabove, the answering programs are timed so that if an error occurs in the answering program it will be detected by the timer and a D output signal will be developed by the Error Detection Circuit as described hereinabove.

The D output signal is utilized to stop the operation of the computer so as to require manual intervention to restart it. The reason for this is that a D output signal indicates a malfunction in the computer itself as against an error due to defective input information from peripheral equipment. If an error is detected during the internally stored answering programs initiated by the B and C output signals the error would have to be due to a computer defect. Since new information is derived from a different location in a new query, the occurrence of a D output signal, which indicates an error has occurred in two successive queries, signifies that the error is probably due to a computer defect.

The portion of FIGURE 2 enclosed by dotted lines shows a typical use of the D output signal. The presence of a D output signal will set flip-flop 108 to the "1" state which will result in energization of relay K–64. The contacts of said relay can then switch operation to a standby computer.

Thus, it is apparent that there is provided by this invention circuits in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A circuit for discriminating between electronic operations of correct and excessive time duration comprising a first input, timing means connected to said first input and preset to operate for a period longer than said correct duration, a signal on said first input activating said timing means and causing it to begin operation at a predetermined time relationship with the start of a first electronic operation, a second input connected to said timing means, a signal on said second input causing said timing means to stop operation and return to its initial setting at a predetermined time relationship with the end of said electronic operation, and a first output connected to said timing means for receiving a signal therefrom, said signal originating when the timing means has been operating for a period longer than said correct duration so that said signal on the first output line indicates an electronic operation of excessive duration is being performed.

2. A circuit as in claim 1 wherein there is further included a second output connected through a first switching means to said timing means, said switching means receiving a signal from the first output when activated and effectively disconnecting said first output from said timing means upon receipt of said signal, the signal on the first output also causing the electronic and corresponding timing operations to be repeated, said second output receiving a signal from said timing means when the repeated operation is of excessive duration.

3. A circuit as in claim 2 wherein there is further included a third output connected through a second switching means to said timing means, said second switching means receiving a signal from said second output when it is activated, said signal causing said second switching means to effectively disconnect the second output, said third output receiving a signal from said timing means when another electronic operation following said repeated operation is of excessive duration.

4. A circuit as in claim 1 wherein there is a second output connected through switching means to said timing means, a third input connected to said switch means, a signal on the third input causing said second switching means to effectively disconnect the first output from the timing means, said third output receiving a signal from said timing means when the first electronic operation is of excessive duration and the third input is activated.

5. A circuit as in claim 4 wherein there is included a third output connecting through a second switching means to said timing means, said second switching means receiving a signal from said second output when it is activated, said signal causing said second switching means to effectively disconnect the second output, said third output receiving a signal from said timing means when another electronic operation following the first electronic operation is of excessive duration.

6. A circuit for discriminating between electronic operations of correct and excessive time duration comprising a first input, timing means connected to said first input and preset to operate for a period longer than said correct duration, a signal on said first input activating said timing means and causing it to begin operation at a predetermined time relationship with the start of said electronic operation, a second input connected to said timing means, a signal on said second input causing said timing means to stop operation and return to its initial setting at a predetermined time relationship with the end of said electronic operation, a first output connected to said timing means for receiving a signal therefrom, said signal originating when the timing means has been operating for a period longer than said correct duration, a second output connected through a first switching means to said timing means, said switching means also receiving the signal on said first output and effectively disconnecting said first output from said timing means upon said signal receipt, the signal on the first output line also causing the electronic and corresponding timing operations to be repeated, said second output line receiving a signal from said timing means when the repeated operation is excessive, a third output connected through a second switching means to said timing means, a third input connected to said second switching means, a signal on the third input causing said second switching means to effectively disconnect the first and second outputs from the timing means, said third output receiving a signal from said timing means when the electronic operation is excessive and a signal has been placed on the third input, a fourth output connected through a third switching means to said timing means, said third switching means receiving a signal from said second output when it is activated, and from said third output when it is activated, said second output signal causing said third switching means to effectively disconnect the second and third outputs, said third output signal causing said third switching means to effectively disconnect the first, second and third outputs, said fourth output receiving a signal from the timing means when another electronic operation directly following said repeated operation is of excessive duration.

7. In a digital data system of the type having a start of operation signal, an end of operation signal and having digital data operations of predetermined time durations, an automatic error detection circuit comprising a first input, timing means connected to said first input and preset to operate for a period longer than the longest correct digital data system operation, a start signal from the digital data system placed on the first input activating said timing means and causing it to begin operation at a predetermined time relationship with the start of a first digital data system operation, a second input connected to said timing means, an end of operation signal from the digital data system placed on the second input for indicating the end of said digital data system operation, said signal causing the timing means to stop operation and return to its initial setting at a predetermined time relationship with the end of said operation, and a first output connected to said timing means for receiving a signal therefrom, said signal originating when the timing means has been operating for a period longer than the longest correct digital data system operation so that a signal on the first output indicates an error in the first digital data operation has taken place.

8. A circuit as in claim 7 wherein there is further included a second output connected through a first switching means to said timing means, said switching means receiving a signal from the first output when activated, said signal causing the first switching means to effectively disconnect said first output from said timing means, the signal from said first output also being returned to the digital data system causing said first operation and corresponding timing sequence to be repeated, said second output receiving a signal from said timing means when it has been operating for a duration longer than the longest correct digital data operation, a signal on said second output thereby indicating another error has occurred in performing the repeated operation.

9. A circuit as in claim 8 wherein there is further included a third output connected through a second switching means to said timing means, said second switching means receiving a signal from said second output when it is activated, said signal causing said second switching means to effectively disconnect the second output, the signal from the second output being returned to the digital data system and causing a different operation and a corresponding timing sequence to be performed, said third output receiving a signal from said timing means when it has been operating for a duration longer than the longest correct digital data system operation so that a signal on the third output line indicates the probability of a malfunction in the computer itself.

10. A circuit as in claim 9 wherein the signal from said second output which is returned to the digital data system initiates a predetermined computer operation and a corresponding timing sequence.

11. A circuit as in claim 9 wherein there is a fourth input line connected to said first and said second switching means, said second switching means including an AND gate, a start signal from the digital data system placed on the first and fourth inputs at a predetermined time relationship with the start of said different operation, the signal on the fourth input being effective to connect the first output to the second switching means while at the same time enabling said AND gate so that a subsequent start pulse placed on the first and fourth outputs at a predetermined time relationship with a subsequent digital data system operation will cause the second switching means to effectively connect the first output to the timing means and effectively disconnect the third output therefrom.

12. A circuit as in claim 7 wherein there is a second output connected through switching means to said timing means, a third input connected to said switching means, a signal from a predetermined location in the computer portion of said digital data system placed on the third input, said signal causing said switching means to effectively disconnect the first output from the timing means, said third output receiving a signal from the timing means when it has been operating for a duration longer than the longest correct digital data operation, and the third input has been activated.

13. A circuit as in claim 12 wherein said predetermined location in the computer is the computer memory.

14. A circuit as in claim 12 wherein there is included a third output connected through a second switching means to said timing means, said second switching means receiving a signal from said second output when it is activated, said signal causing said second switching means to effectively disconnect the second output from said timing means, the signal from said second output also being returned to the digital data system causing a different operation and a corresponding timing sequence to be performed, said third output receiving a signal from said timing means when it has been operating for a duration longer than the longest correct digital data system operation so that a signal on the third output line indicates the probability of a malfunction in the computer itself.

15. A circuit as in claim 14 wherein the signal from the second output line which is returned to the digital data system initiates a predetermined computer operation and a corresponding timing sequence.

16. A circuit as in claim 14 wherein there is a fourth input connected to said first and second switching means, said second switching means including an AND gate, a start signal from the digital data system placed on the first and fourth inputs at a predetermined time relationship with the start of said different operation, the signal on the fourth input being effective to connect the first output to the second switching means while at the same time enabling said AND gate so that a subsequent start pulse placed on the first and fourth outputs at a predetermined time relationship with a subsequent digital data system operation will cause the second switching means to effectively connect the first output to the timing means and effectively disconnect the third output therefrom.

17. In a digital data system of the type having a start of operation signal and an end of operation signal, and having digital data operations of predetermined time durations, an automatic error detection circuit comprising: a first input, timing means connected to said first input and preset to operate for a period longer than the longest correct digital data system operation, a start signal from the digital data system placed on the first input activating said timing means and causing it to begin operation at a predetermined time relationship with the start of a first digital data system operation, a second input connected to said timing means, an end of operation signal from the digital data system placed on the second input for indicating the end of said digital data system operation, said signal causing the timing means to stop operation and return to its initial setting at a predetermined time relationship with the end of said operation, a first output connected to said timing means for receiving a signal therefrom, said signal originating when the timing means has been operating for a duration longer than the longest correct digital data system operation, a second output connected through a first switching means to said timing means, said first switching means receiving a signal from said first output when activated, said signal causing the first switching means to effectively disconnect said first output from said timing means, the signal from said first output also being returned to the digital data system causing said first operation and corresponding timing sequence to be repeated, said second output receiving a signal from said timing means when it has been operating for a duration longer than the longest correct digital data operation, a third output connected through a second switching means to said timing means, a third input connected to said second switching means, a signal from a predetermined portion of a computer placed on said third input line, said computer being part of the digital data system and said signal causing the second switching means to effectively disconnect the first and second outputs from the timing means, said third output receiving a signal from said timing means when the third input has been activated and the timing means has been operating for a duration longer than the longest correct digital data system operation, a fourth output connected through a third switching means to said timing means, said third switching means receiving a signal from said second output when it is activated, and from said third output when it is activated, said second output signal causing said third switching means to effectively disconnect said second and third outputs, said third output signal causing said third switching means to effectively disconnect said first, second and third outputs, both second and third output signals being returned to the digital data system causing an operation different from said first operation and corresponding timing sequence to be performed, said fourth output receiving a signal from said timing means when it has been operating for a duration longer than the longest correct operation duration.

18. A circuit as in claim 17 wherein said second and third output signals which are returned to the digital data system each initiate a predetermined computer operation and a corresponding timing sequence.

19. A circuit as in claim 17 wherein there is a fourth input connected to said first, second and third switching means, said switching means including an AND gate, a start signal from the digital data system placed on the first and fourth inputs at a predetermined time relationship with the start of said different operation, the signal on the fourth input causing said first and second switching means to effectively connect the first output to the second switching means while at the same time enabling said AND gate so that a subsequent start pulse placed on the first and fourth outputs at a predetermined time relationship with a subsequent digital data system operation will cause the third switching means to effectively connect the first output to the timing means and effectively disconnect the third output therefrom.

20. A circuit for detecting an error in an electronic operation having a predetermined correct time duration comprising an electronic timer means, means for starting said timer at a predetermined time relationship with the start of the electronic operation, means for stopping said timer at a predetermined time relationship with the end of the electronic operation, and means for timing the electronic operation, said timer including means for producing an electrical indication only when the electronic operation exceeds said predetermined correct operation time.

References Cited by the Examiner

UNITED STATES PATENTS

| | | | |
|---|---|---|---|
| 2,276,646 | 3/42 | Boswau | 340—163 |
| 2,424,571 | 7/47 | Lang | 340—163 |
| 2,589,465 | 3/52 | Weiner | 340—248 |
| 2,679,037 | 5/54 | O'Keefe | 340—248 |
| 2,719,226 | 9/55 | Gordon et al. | 328—129 |
| 2,819,457 | 1/58 | Hamilton et al. | 340—172.5 |
| 2,835,807 | 5/58 | Lubkin | 328—129 |
| 2,925,591 | 2/60 | Burkhart | 340—213 |
| 2,959,351 | 11/60 | Hamilton et al. | 235—153 |

MALCOLM A. MORRISON, *Primary Examiner.*

EVERETT R. REYNOLDS, IRVING L. SRAGOW, WALTER W. BURNS, *Examiners.*